(12) United States Patent
Sagae et al.

(10) Patent No.: US 8,345,582 B2
(45) Date of Patent: Jan. 1, 2013

(54) MOBILE COMMUNICATIONS SYSTEM, BASE STATION APPARATUS, USER APPARATUS AND METHOD

(75) Inventors: Yuta Sagae, Kawasaki (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 301 days.

(21) Appl. No.: 12/867,507

(22) PCT Filed: Jan. 15, 2009

(86) PCT No.: PCT/JP2009/050459
§ 371 (c)(1),
(2), (4) Date: Oct. 19, 2010

(87) PCT Pub. No.: WO2009/104435
PCT Pub. Date: Aug. 27, 2009

(65) Prior Publication Data
US 2011/0032848 A1 Feb. 10, 2011

(30) Foreign Application Priority Data
Feb. 19, 2008 (JP) .................................. 2008-038023

(51) Int. Cl.
*H04B 7/005* (2006.01)
(52) U.S. Cl. ........................................ 370/278; 370/281
(58) Field of Classification Search .......................... None
See application file for complete search history.

(56) References Cited

U.S. PATENT DOCUMENTS

| | | | | |
|---|---|---|---|---|
| 6,615,044 B2 * | 9/2003 | Tigerstedt et al. | ............ | 455/437 |
| 6,839,333 B1 * | 1/2005 | Åkerberg | ....................... | 370/330 |
| 7,142,861 B2 * | 11/2006 | Murai | ............................ | 455/444 |
| 7,376,429 B2 * | 5/2008 | Choukroun et al. | ....... | 455/456.1 |
| 8,068,444 B2 * | 11/2011 | Brunel et al. | ................. | 370/275 |
| 2001/0053695 A1 * | 12/2001 | Wallentin | ....................... | 455/436 |
| 2002/0173314 A1 * | 11/2002 | Hwang et al. | ................. | 455/453 |
| 2003/0050097 A1 * | 3/2003 | Amirijoo et al. | .............. | 455/560 |
| 2003/0232622 A1 * | 12/2003 | Seo et al. | ....................... | 455/437 |
| 2004/0192323 A1 * | 9/2004 | Valenzuela | ................. | 455/452.2 |

(Continued)

FOREIGN PATENT DOCUMENTS

JP 2004-349971 A 12/2004
(Continued)

OTHER PUBLICATIONS

International Search Report w/translation from PCT/JP2009/050459 dated Mar. 10, 2009 (3 pages).

(Continued)

*Primary Examiner* — Otis L Thompson, Jr.
(74) *Attorney, Agent, or Firm* — Osha Liang LLP

(57) ABSTRACT

A base station apparatus used for a FDD mobile communications system which uses at least a predetermined frequency bandwidth is disclosed. The base station apparatus includes a control unit which provides an instruction signal which at least indicates a frequency band used in wireless communications; and a unit which wirelessly communicates with a user apparatus according to the instruction signal, wherein, if the base station apparatus belongs to a predetermined border area between mobile communications systems, an instruction signal which indicates that use of one part of the predetermined frequency band is permitted, but use of another part is prohibited is provided by the control unit, and, if the base station apparatus belongs to a predetermined non-border area, an instruction signal which indicates that use of one part and use of the other part are permitted.

10 Claims, 10 Drawing Sheets

U.S. PATENT DOCUMENTS

| | | | |
|---|---|---|---|
| 2004/0242260 A1* | 12/2004 | Lescuyer | 455/525 |
| 2008/0032726 A1* | 2/2008 | Tajima et al. | 455/509 |
| 2008/0287124 A1* | 11/2008 | Karabinis | 455/427 |
| 2010/0216470 A1* | 8/2010 | Pamp et al. | 455/436 |
| 2010/0233962 A1* | 9/2010 | Johansson et al. | 455/63.1 |

FOREIGN PATENT DOCUMENTS

| | | |
|---|---|---|
| JP | 2006-191649 A | 7/2006 |
| JP | 2006-518562 A | 8/2006 |
| JP | 2007-258844 A | 10/2007 |
| WO | 2004/073210 A1 | 8/2004 |

OTHER PUBLICATIONS

Written Opinion from PCT/JP2009/050459 dated Mar. 10, 2009 (3 pages).

* cited by examiner

MOBILE COMMUNICATIONS SYSTEM, BASE STATION APPARATUS, USER APPARATUS AND METHOD

BACKGROUND OF THE INVENTION

1. Field of the Invention

The present invention generally relates to frequency division duplex (FDD) mobile communications and particularly relates to achieving reduced interference between multiple FDD systems which allocate different frequencies.

2. Description of the Related Art

In general, as schemes for realizing full-duplex communications, there are an FDD scheme and a time division duplex (TDD) scheme. The FDD scheme uses different frequencies for transmission and reception to realize simultaneous transmission and reception. The TDD scheme alternately switches between transmit and receive timings to effectively realize simultaneous communications. Furthermore, the FDD and TDD schemes may be used together, and a frequency bandwidth allocated for FDD operations may be switched for use in the TDD scheme to adjust a balance of resources used in uplink and downlink and improve frequency utilization efficiency (see Patent document 1, for example). Moreover, there is also a method of varying duplex schemes to be used between neighboring cells, and improving on service areas and performance (see Patent document 2, for example.)

Patent document 1: Japanese translation (No, 2006-518562) of PCT application publication Patent Document 2 JP2006-191649A

SUMMARY OF THE INVENTION

Problem(s) to be Solved by the Invention

However, there was a following problem with a communications scheme using a related-art division duplex scheme: when multiple FDD systems using different frequency allocation schemes neighbor each other, the same frequency bandwidth may be used in uplink (or downlink) in one of the systems and in downlink (or uplink) in the other of the systems. In this case, in a border area, there is a concern that interference may occur due to simultaneous transmission/reception in the same frequency. In order to avoid this, a duplex spacing may be provided in uplink and downlink frequencies between areas using different frequency allocation schemes, and interference in the border area may be suppressed, and use of the frequency bandwidth may be prevented. Moreover, for the TDD scheme, a guard band area may also be provided between different systems using the same frequency band. However, in order to provide a duplex spacing, a frequency bandwidth which is not available for use in any area of a system must be secured. In fact, use of the duplex spacing frequency is prohibited even in an area with no concern of interference, causing a concern that resources may end up becoming wasted. Moreover, in order to provide a guard band area, some bandwidth is not used for communications in any area. In fact, communications using a bandwidth allocated as the guard band is prohibited even in an area with no concern of interference, causing a concern that resources may end up becoming wasted. Therefore, a division duplex scheme is desired in the art, which achieves an improved utilization efficiency of communications resources while reducing interference when systems of different frequency utilization schemes co-exist.

Means for Solving the Problem

The problem to be solved by the invention is to achieve an effective utilization of resources while suppressing interference in a system border area when a certain frequency band is used for uplink in a certain FDD system, but is used for downlink in a different FDD system operated in a neighboring area.

The base station apparatus includes:

a control unit which, based on location information of the base station apparatus, provides an instruction signal which at least indicates a frequency band used in wireless communications; and a unit which wirelessly communicates with a user apparatus according to the instruction signal.

The user apparatus includes:

a unit which receives a control signal from the base station apparatus and retrieves the instruction signal from the control signal; and a unit which wirelessly communicates with the base station apparatus according to the instruction signal.

If the base station apparatus belongs to a predetermined border area between mobile communications systems, an instruction signal which indicates that use of one part of the predetermined frequency band is permitted, but use of another part is prohibited is provided by the control unit.

If the base station apparatus belongs to a predetermined non-border area, an instruction signal which indicates that use of one part of the predetermined frequency band and use of the other part are permitted.

Advantage of the Invention

The present invention makes it possible to achieve an effective utilization of resources while suppressing interference at a system border area when a certain frequency band is used for uplink in a certain FDD system, but is used for downlink in a different FDD system operated in a neighboring area.

DESCRIPTION OF THE PREFERRED EMBODIMENTS

Figure 1:
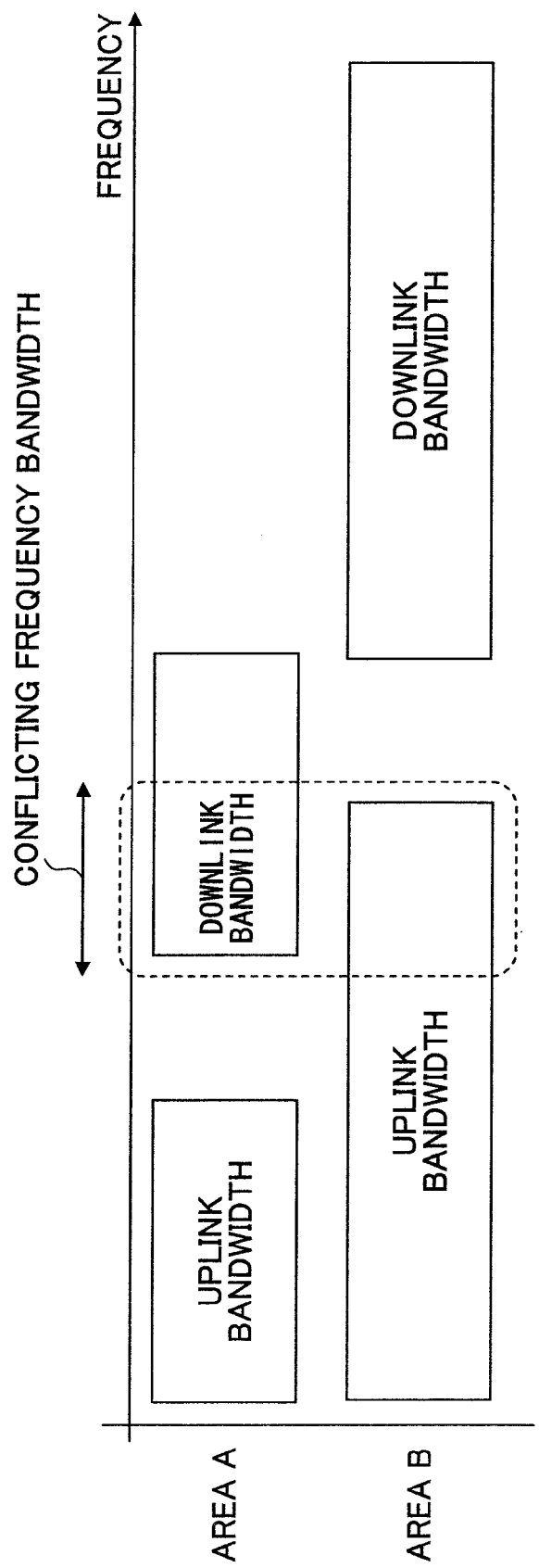
FIG. 1 is a drawing for explaining a related-art frequency allocation method which causes interference.

Description of Notations 21-22 radio network controllers; 601 radio network controller; 602 base station apparatus; 603 base station location information storage; 604 downlink bandwidth selector; 605 downlink duplex method selector; 606 downlink transmission time selector; 607 uplink bandwidth selector; 608 uplink duplex method selector; 609 uplink transmission time selector; 610 downlink transmitter; 611 downlink controller; 612 uplink control signal generator; 1001 radio network controller; 1002 base station apparatus; 1003 base station location information storage; 1004 downlink bandwidth selector; 1005 downlink duplex method selector; 1006 downlink transmission time selector; 1007 uplink bandwidth selector; 1008 uplink duplex method selector; 1009 uplink transmission time selector; 1010 downlink transmitter; 1011 downlink controller; 1012 uplink control signal generator; 1013 different system uplink receiver

BEST MODE OF CARRYING OUT THE INVENTION

In one embodiment of the invention, a border-area radio station which uses a different frequency allocation scheme uses an FDD scheme which includes a temporal aspect for dividing between uplink and downlink. Suppose a band allocated in one system for uplink and a band allocated in another system for downlink are the same. In this case, each system sets a band used by each system such that the same band is not used simultaneously, thus making it possible to achieve an effective utilization of frequency resources while avoiding interference at a border area. In addition, it is possible to set a non-transmission interval and use it as a guard time such that it is used for different systems to not conduct communications simultaneously at the border area. Thus, it is made possible to do away with the necessity of providing for a guard band separately when using uplink and downlink at the border area.

In one embodiment of the invention, a semi-border area is provided between a non-border area and a border area which uses both FDD and TDD schemes. At the semi-border area, the FDD scheme is used but the TDD scheme is not. At the semi-border and non-border areas, simultaneous use of the same frequency band for uplink and downlink is permitted. This is preferable from a viewpoint of limiting an area prohibiting simultaneous use of uplink and downlink to only the border area and keeping unused frequencies to a required minimum.

In one embodiment of the invention, information of neighboring area and base station location information may be held by the base station apparatus, or may be held by an apparatus (for example, an access gateway, MME/UPE, radio access network controller, etc.) upper to the base station. Based on such sets of information, control of frequency and/or timing used in uplink and downlink is performed.

In one embodiment of the invention, a non-transmission time downlink may be used to observe an uplink signal, adaptively changing a transmission method. For example, the base station apparatus may receive an uplink signal from another system which uses in uplink the same band as in downlink, and adaptively determine the frequency band used in communications, taking into account the above-mentioned information. For example, based on information obtained from bandwidth used by a terminal, and a total received power of a signal transmitted from all terminal apparatuses used, bandwidth, transmission timing, and duplex method, etc., of a signal transmitted by the base station apparatus may be varied adaptively.

At a non-border area (a non-neighboring area) which is different from a border area between systems, interference is not likely to occur even if the same frequency band is used between systems. However, when the same frequency band is used between systems at a border area (neighboring area), interference due to simultaneous transmission/reception may occur. Any embodiment of the invention may be used and vertically non-symmetrical frequency and time slot allocations may be performed from time and/or frequency viewpoints to achieve effective utilization of resources while avoiding interference at the border area. At the non-border area, a related-art FDD scheme is utilized while at the border area, interference is avoided and resources are effectively utilized according to the invention. In addition, it is not mandatory to provide in advance a guard band as before which provides for different bands to not interfere when using the different bands among areas. In addition, efficiency of frequency utilization may be further enhanced by adaptively varying bandwidth and/or transmission interval and/or duplex method.

While specific numerical value examples are used to facilitate understanding of the present invention, such numerical values are merely examples, so that any appropriate value may be used unless specified otherwise.

Embodiment 1

A communications scheme using an FDD that utilizes a non-transmission interval according to an embodiment of the present invention is described using the drawings. First, an overview of a system considered in the present embodiment is described. In the present embodiment, a first mobile communications system using an FDD scheme and a second mobile communications system using an FDD scheme coexist, neighboring each other with a certain border area as a border. A service area of the first mobile communications system is referred to as "an area A", while a service area of the second mobile communications system is referred to as "an area B". In the explanation below, "the area A" and "a system A" are used synonymously, while "the area B" and "a system B" are used synonymously. While a case such that two FDD systems coexist is explained in the embodiment, the present invention is also applicable to a case such that three or more systems neighbor one another.

FIG. 1 shows a related-art frequency allocation method in the areas A and B. In either of the areas, respectively different frequency bands are used for uplink and downlink. As shown, "conflicting frequency bandwidths" are to be used in different directions between the systems A and B, the different directions being uplink and downlink. Therefore, as such, interference is caused in at least the border area. In the present embodiment, a method of allocating in a portion illustrated with a wavy-line frame shown is improved to overcome the concern of such interference as described above.

Figure 2:
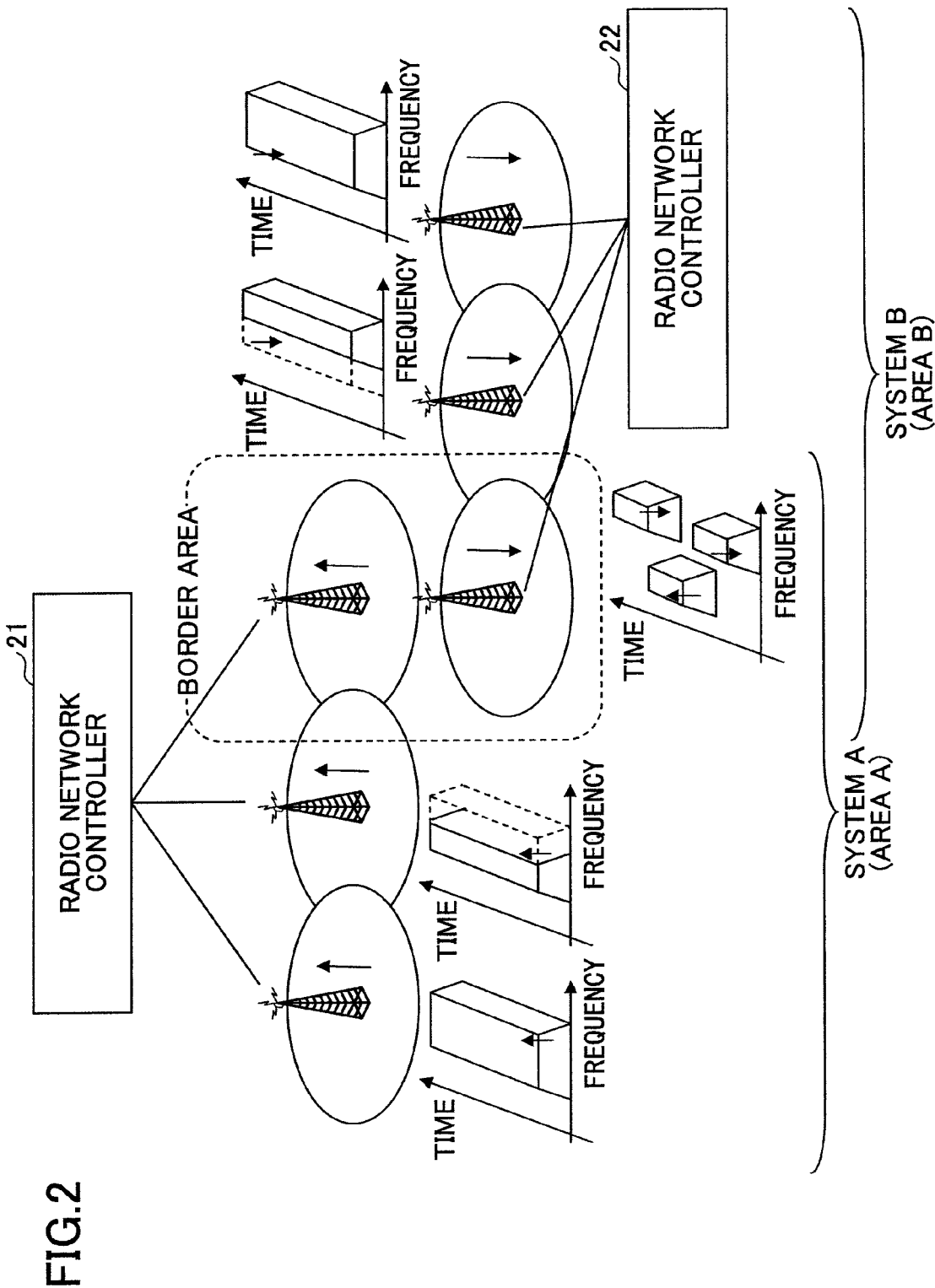
FIG. 2 is a conceptual diagram of a system according to an embodiment of the present invention.

FIG. 2 shows a system according to one embodiment of the present invention. In the example shown, a system A includes three cells and base stations, and a radio network controller 21 connected to each of the base stations. A system B also includes three cells and base stations, and a radio network controller 22 connected to each of the base stations. The systems A and B neighbor each other at a location shown as "a border area".

FIG. 2 also shows a conceptual diagram of a method of utilizing resources (frequency and time) according to the present embodiment. In general, an upward arrow shows uplink, while a downward arrow shows downlink. An axis which is orthogonal to the frequency and time axes schematically represents power.

Transmitting uplink and downlink signals simultaneously using the same frequency at the border area causes interference to occur. In order to avoid this, areas within a system in the present embodiment are categorized into "border area", "semi-border area" and "non-border area", where the use of frequency differs from area to area. In the border area, a duplex scheme, which uses not only the FDD scheme but also the TDD scheme, is used.

Figure 3:
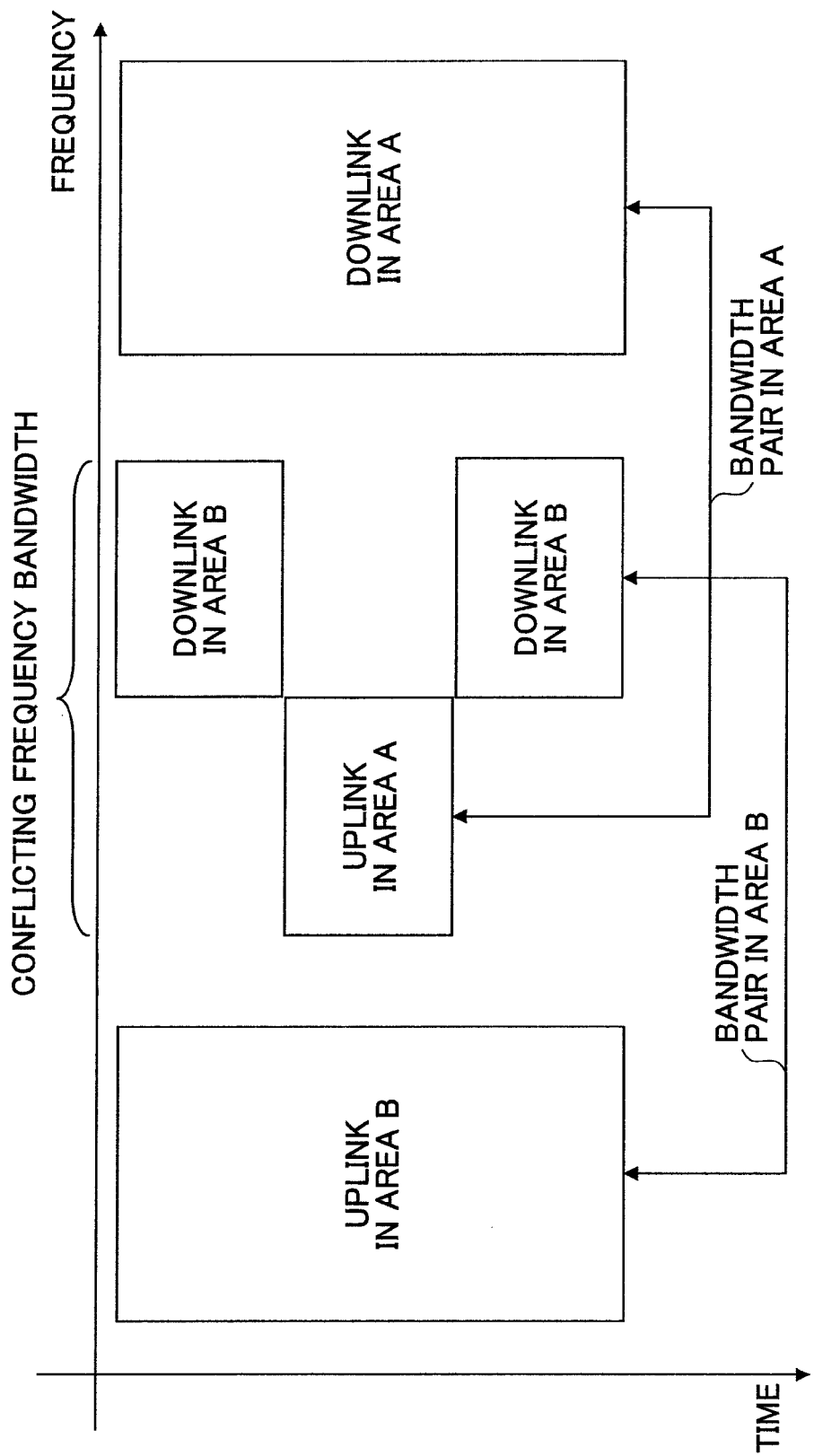
FIG. 3 is a diagram illustrating an exemplary frequency allocation method at a border area.

FIG. 3 is a diagram illustrating an exemplary frequency allocation method at a border area; in the "conflicting frequency bandwidth", time and frequency are divided so as to conduct transmission and reception. This makes it possible to suppress, in a substantially accurate manner, an occurrence of interference at the border area between the systems A and B.

Moreover, even in an area neighboring a border area, simultaneously conducting uplink and downlink transmission/reception at the same frequency may cause interference to occur. Therefore, in the present embodiment, simultaneous transmission and reception in the same frequency even in a semi-border area is prohibited. The semi-border area may be defined, for example, as an area neighboring a border area, or an area located between the border area and a central portion of an area. In the semi-border area, an effect on a neighboring system (or an effect received there from) is smaller the nearer to the semi-border area, so that merely the FDD scheme is used.

Figure 4:
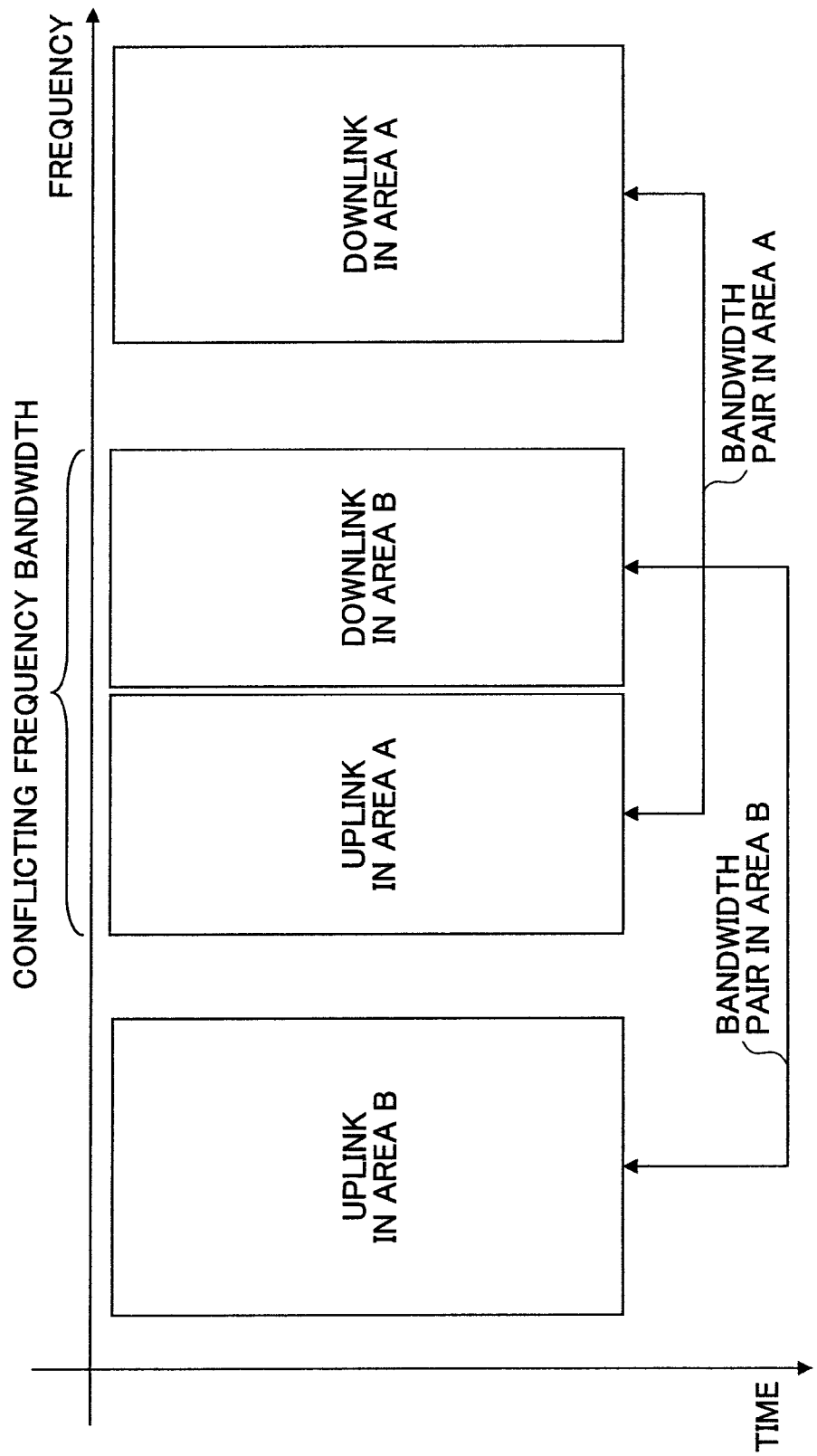
FIG. 4 is a diagram illustrating an exemplary frequency allocation method at a semi-border area.

FIG. 4 shows an exemplary method of frequency allocation in a semi-border area. The frequencies utilized are the same as in the case of FIG. 3, except that they are apart from the border, so that amount of interference between neighboring frequencies becomes small. Therefore, the FDD scheme which allows simultaneous transmission and reception in different frequencies is used.

Figure 5:
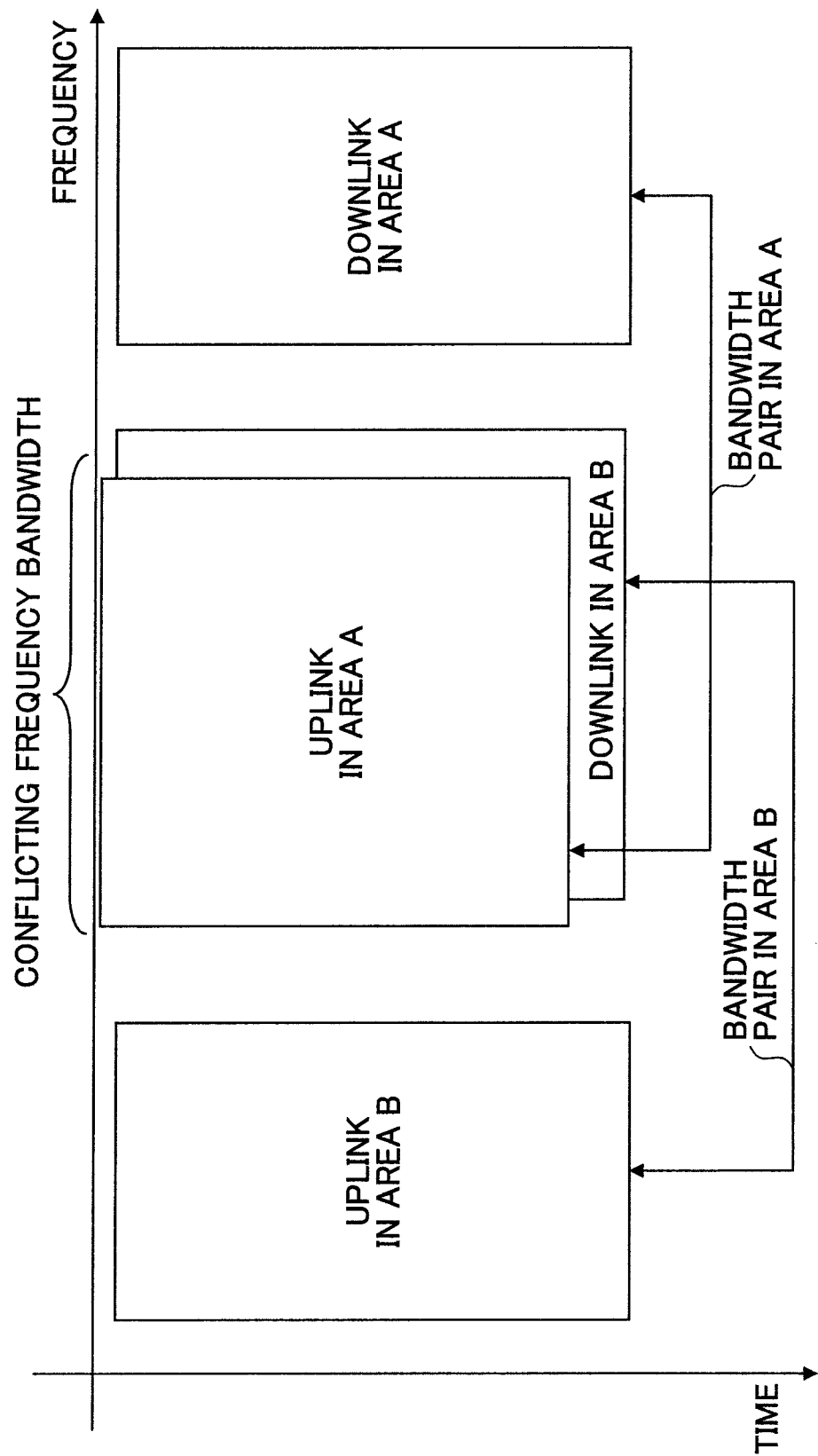
FIG. 5 is a diagram of an exemplary method of frequency allocation in a non-border area.

FIG. 5 illustrates an exemplary method of frequency allocation in an area (non-border area) which is sufficiently apart from the border. As it is sufficiently apart from the border, interference between systems may be ignored even if the same frequency is simultaneously transmitted and received in different directions, which directions being uplink and downlink. Therefore, "the conflicting frequency bandwidth" is allowed to be independently used by each system.

In this way, frequency and transmission time to be used can be changed according to a location at which a base station is provided to achieve an effective utilization of resources and suppression of interference at the border area. Such frequencies can be allocated to each operator to increase utilization efficiency of frequency resources without widening duplex spacing in view of the border area. At a location remote from the border area, the bandwidth can be used continuously as in the past.

Figure 6:
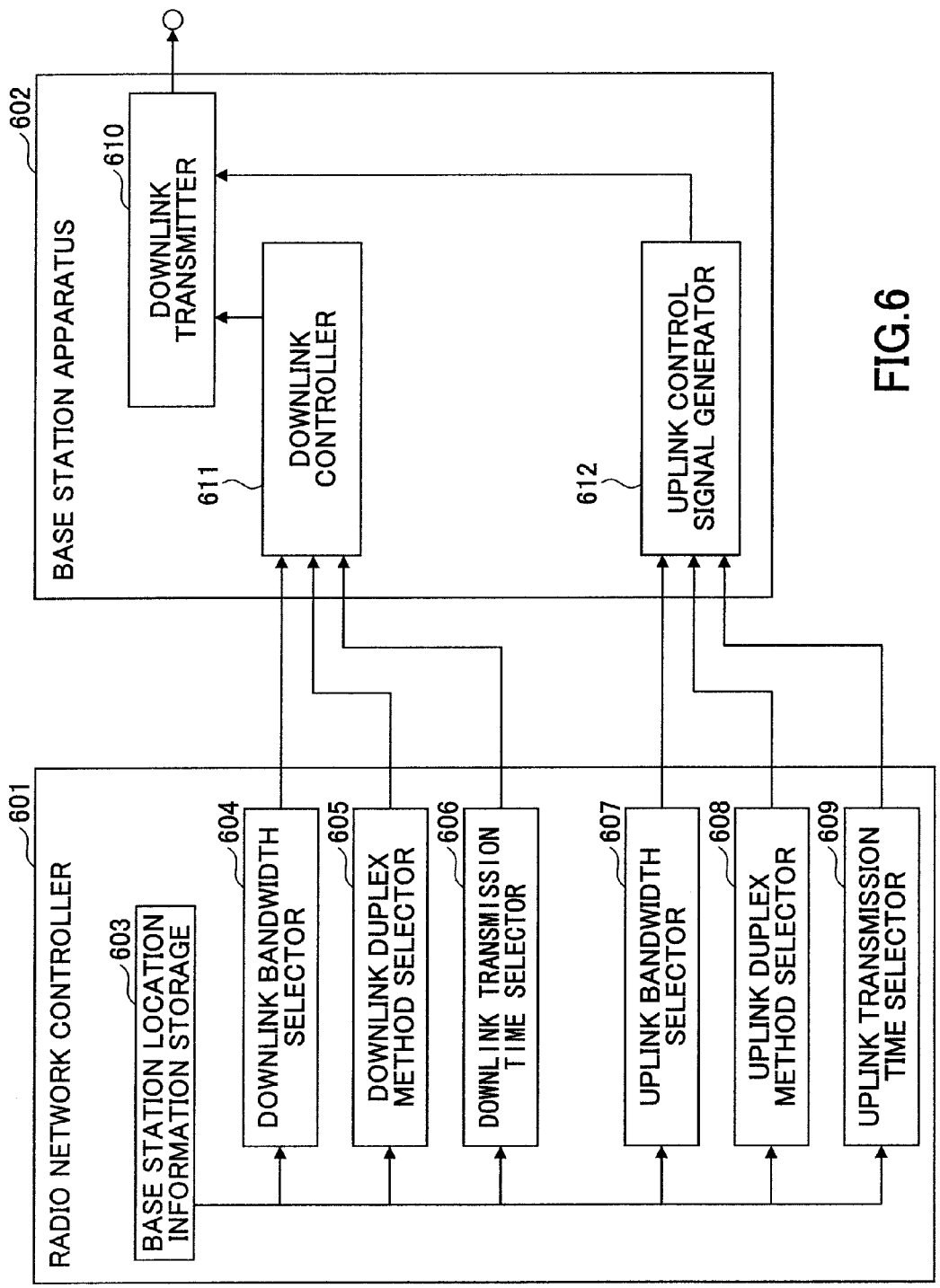
FIG. 6 is a diagram illustrating a radio network controller and a base station according to an embodiment of the present invention.
Figure 7:
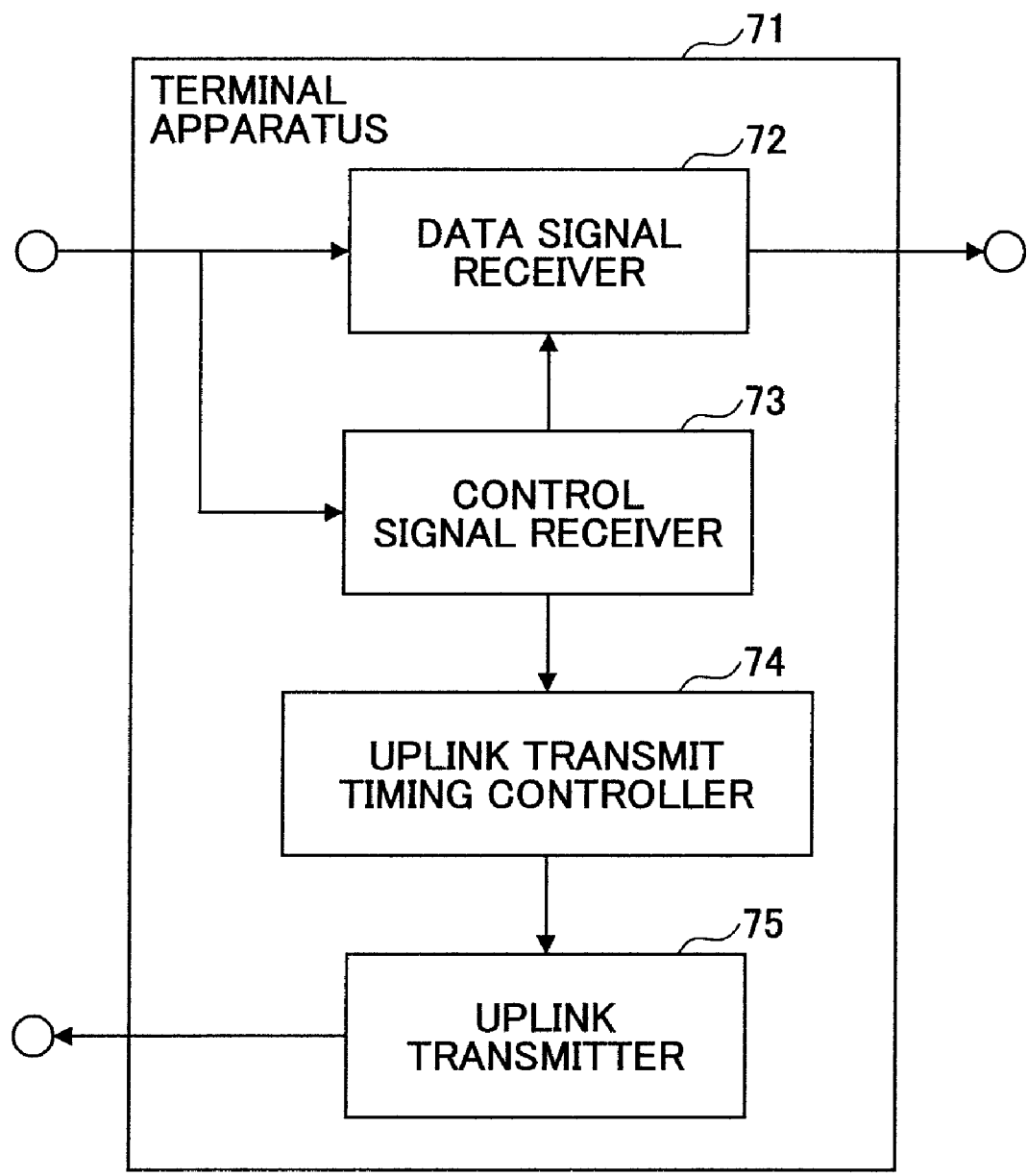
FIG. 7 is a diagram illustrating a terminal apparatus according to an embodiment of the present invention.

Next, a radio network controller, a base station apparatus, and a terminal apparatus that are used in the present embodiment are described. FIG. 6 illustrates a radio network controller and a base station apparatus, while FIG. 7 illustrates a configuration of a terminal apparatus. For convenience of explanation, it is shown how the radio network controllers are separately provided as apparatuses upper to the base station apparatuses, which is not mandatory. All or some of functions explained as functions of the radio network controller may be incorporated into the base station apparatus.

FIG. 6 shows a radio network controller 601, base station location information storing unit 603, a downlink bandwidth selector 604, a downlink duplex method selector 605, a downlink transmission time selector 606, an uplink bandwidth selector 607, an uplink duplex method selector 608, an uplink transmission time selector 609, a base station apparatus 602, a downlink transmitter 610, a downlink controller 611, and a uplink control signal generator 612.

The base station location information storage 603 stores location information of the base station apparatus. Using this location information, it is determined as to which one of the border area, semi-border area, and non-border area, individual base station apparatuses within a service area belong to.

The downlink bandwidth selector 604 selects frequencies used by the base station apparatus in downlink according to a location of the base station apparatus.

The downlink duplex scheme selector 605 selects a duplex scheme to be used by the base station apparatus in downlink according to a location of the base station apparatus. More specifically, whether merely the FDD scheme, or a combination of the FDD scheme and the TDD scheme, is selected.

The downlink transmission time selector 606 selects what a time slot is that is to be used by the base station apparatus in downlink according to a location of the base station apparatus.

The uplink bandwidth selector 607 selects frequencies used by the base station apparatus in uplink according to a location of the base station apparatus.

The uplink duplex scheme selector 608 selects a duplex scheme to be used by the base station apparatus in uplink according to a location of the base station apparatus. More specifically, whether merely the FDD scheme, or a combination of the FDD scheme and the TDD scheme, is selected.

The uplink transmission time selector 609 selects what a time slot is that is to be used by the base station apparatus in uplink according to a location of the base station apparatus.

The downlink transmitter 610 generates and transmits a downlink signal, which includes a control signal for downlink, a control signal for uplink, and, as necessary, a downlink signal including a data signal, etc. The bandwidth and time slot, etc. that are used in transmission are instructed from the downlink controller 611.

The downlink controller 611 reports, to the downlink transmitter, the above-described downlink bandwidth selector 604, downlink duplex scheme selector 605, and downlink transmission time selector 606.

The uplink control signal generator 612 includes, in the downlink control signal, information for reporting, to the user apparatus, the frequency bandwidth and the time slot to be used in uplink.

FIG. 7 illustrates a terminal apparatus, which is a user apparatus. FIG. 7 shows a data signal receiver 72, a control signal receiver 73, an uplink transmit timing controller 74, and an uplink transmitter 75.

The data signal receiver 72 receives a data signal transmitted from the base station apparatus.

The control signal receiver 73 receives a downlink control signal transmitted from the base station apparatus. From the control signal, information specifying duplex scheme and/or transmission timing, frequency bandwidth used for data signal communications is retrieved.

The uplink transmit timing controller 74 controls a transmission timing of the uplink signal.

The uplink transmitter 75 transmits an uplink signal under a timing control by the uplink transmit timing controller 74.

Figure 8:
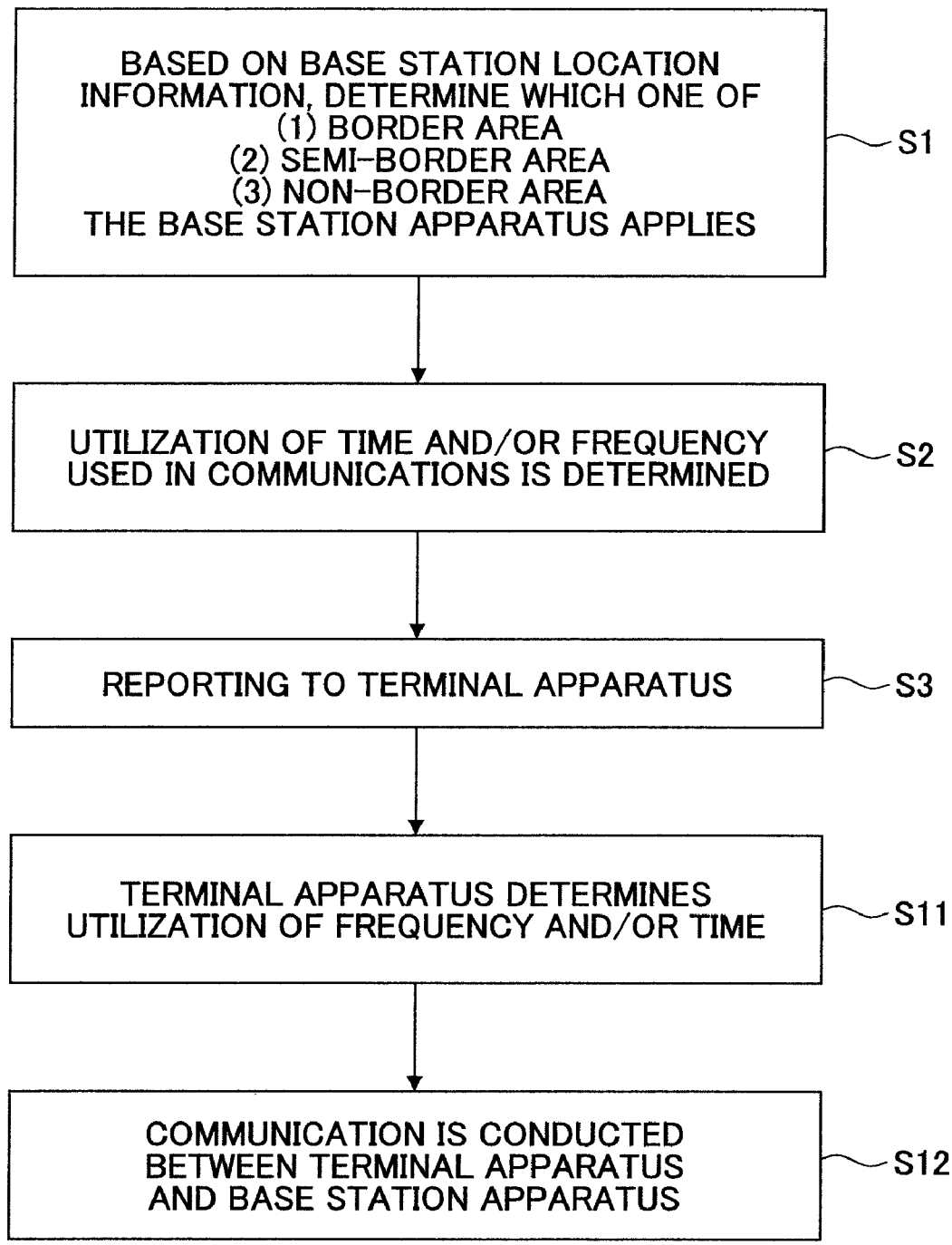
FIG. 8 is a flowchart illustrating an operation according to one embodiment.

FIG. 8 is a flowchart showing an operation according to an embodiment of the present invention.

(S1) In the radio network controller, information on location at which the base station apparatus controlled by the radio network controller is provided is stored at the base station location information storage 603. The radio network controller 601 reports, to the base station apparatus 602, control information on radio bandwidth, duplex method and/or transmission time that are transmitted from the base station apparatus based on base station information stored at the base station location information storage 603. When methods of utilizing a frequency resource differ between coexisting multiple FDD systems, it is grasped, based on location information (latitude and longitude) of a base station apparatus stored in the base station location information storage 603, which one area of (1) border area, (2) semi-border area, and (3) non-border area the base station belongs to.

(S2) In the downlink bandwidth selector 604, a radio bandwidth utilized by the base station in downlink is selected according to the area the base station belongs to. When the border area and the semi-border area are selected, a narrow bandwidth is selected as shown in FIGS. 3 and 4. As shown in FIG. 5, a wide bandwidth is selected in the non-border area. Next, the downlink duplex method selector 605 selects a duplex method utilized by the base station in downlink according to the area the base station belongs to. In the border area, in order to avoid receiving an effect of interference in uplink and downlink near the border, a duplex scheme is selected that limits a transmission time as shown in FIG. 3. In the semi-border area and non-border area, the effect of uplink and downlink interference is small, so that a duplex scheme as shown in FIGS. 4 and 5 is selected. In the downlink transmission time selector 606, information on transmission start timing and time interval for transmitting information by the base station in downlink is selected according to the area the base station belongs to.

In the same manner as downlink, in the radio network controller, uplink bandwidth, duplex scheme, and transmission time for transmission by the terminal apparatus are determined from information on location at which the base station apparatus is provided. In the uplink bandwidth selector 607, a radio bandwidth utilized by the base station in uplink is selected according to the area the base station belongs to. When the border area and the semi-border area are selected, a narrow bandwidth is selected as shown in FIGS. 3 and 4. As shown in FIG. 5, a wide bandwidth is selected in the non-border area. Next, the uplink duplex scheme selector 608 selects a duplex scheme utilized by the base station in uplink according to the area the base station belongs to. In the border area, in order to avoid receiving an effect of interference in uplink and downlink near the border, a duplex scheme is selected that limits a transmission time as shown in FIG. 3. In the semi-area border and non-area border, the effect of uplink and downlink interference is small, so that a duplex scheme as shown in FIGS. 4 and 5 is selected. In the uplink transmission time selector 609, information on transmission start timing and time interval for transmitting information by the base station in uplink is selected according to the area the base station belongs to.

(S3) Information on downlink and uplink resources is transmitted to all terminal apparatuses within an area in the downlink transmitter 610 of the base station apparatus 602.

(S11) Based on a downlink control signal on which a receive process was performed at the control signal receiver 73, the terminal apparatus obtains information on time and frequency resources allocated to data transmitted to the own terminal, and performs a receive process on a data signal at the data signal receive processor 72.

The terminal apparatus recognizes frequency and time resources allocated to the own terminal from an uplink control signal on which the receive process was performed at the control signal receiver 73. Based on the information on frequency and time resources obtained, the uplink transmit timing controller 74 calculates an amount of delay from a reference time to a time of actual transmission and reports the same to the uplink transmitter 75.

(S12) The uplink transmitter 75 transmits an uplink signal according to the reported transmission time.

The respective base station and terminal apparatuses are mutually synchronized. The synchronization may be achieved in any appropriate method known in the art, so that any synchronization signal such as for GPS may be used. In uplink, a downlink control signal including uplink control information (a bandwidth, duplex scheme, transmission time, etc.) is periodically transmitted in a downlink frequency bandwidth. The terminal apparatus receives a control signal transmitted from a base station apparatus, and performs a control such as a transmission timing based on information which makes up a control signal. In the conflicting frequency bandwidth, as shown in FIG. 3, it is arranged that, while downlink transmission is prohibited in one system, the other system uplink transmission is conducted. A downlink signal to be a bandwidth pair with an uplink one having a temporal limitation applied is provided, synchronization control of uplink transmission timing is also performed, and also, in the base station apparatus which conducts downlink transmission, a transmission timing synchronization is performed based on the synchronization signal such as the GPS, after which transmission is conducted.

Figure 9:
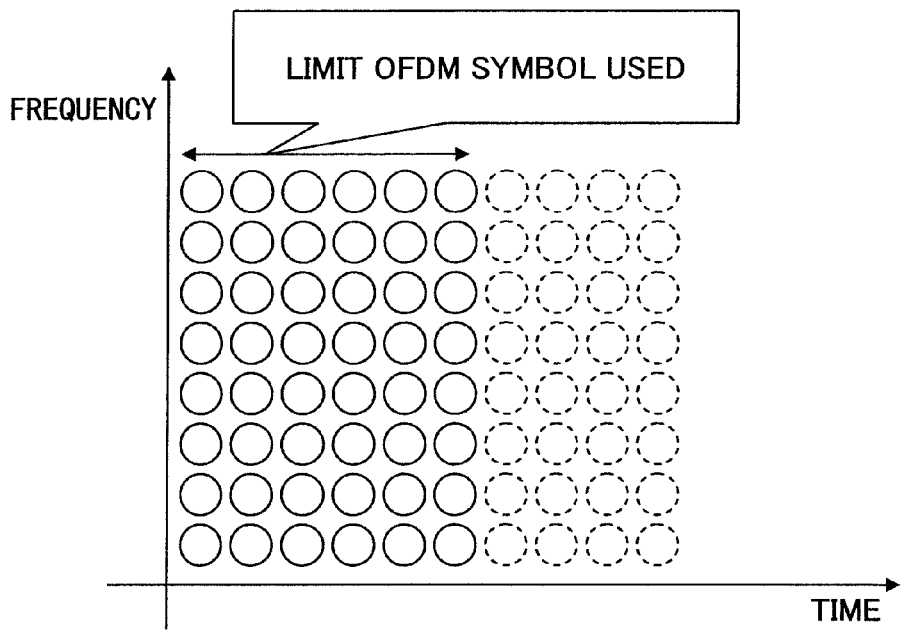
FIG. 9 is a diagram illustrating an exemplary method of limiting a frequency bandwidth when an OFDM scheme is adopted.
Figure 10:
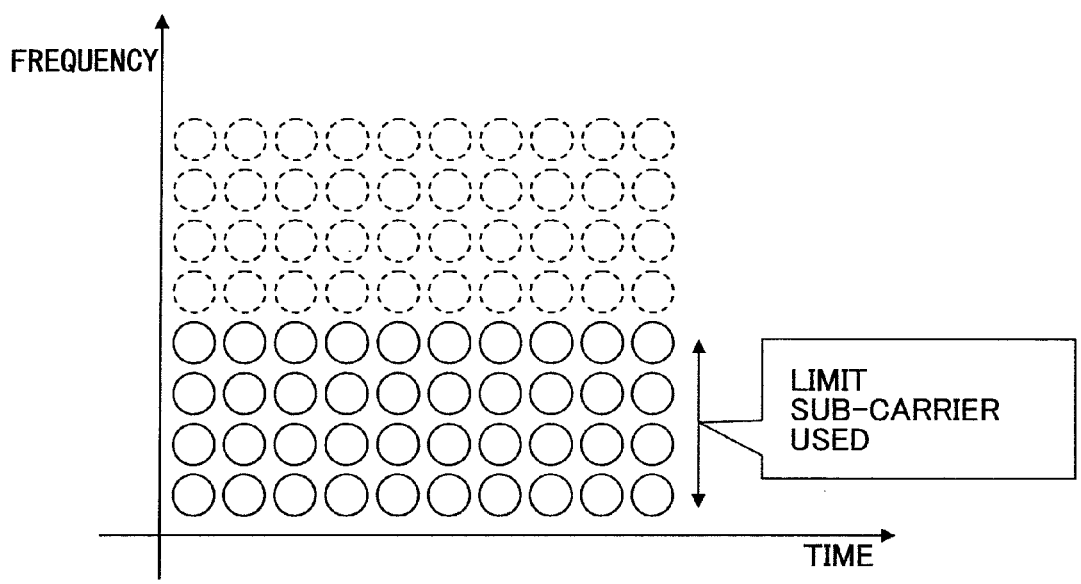
FIG. 10 is a diagram illustrating an exemplary method of limiting a transmission interval when an OFDM scheme is adopted.

FIG. 9 illustrates an exemplary method of changing a transmission time when a radio scheme is adopted which utilizes an orthogonal frequency division multiplexing scheme (OFDM). In the example shown, the number of OFDM symbols to be used in communications is varied to change the transmission period. FIG. 10, which also shows an example of utilizing an OFDM scheme, illustrates an example of changing the frequency bandwidth. Sub-carriers are changed according to the bandwidth to adjust the bandwidth. The number of sub-carriers and the number of OFDM symbols used can be reported to the user apparatus in a control signal to utilize frequency and time resources according to the respective environments.

Figure 11:
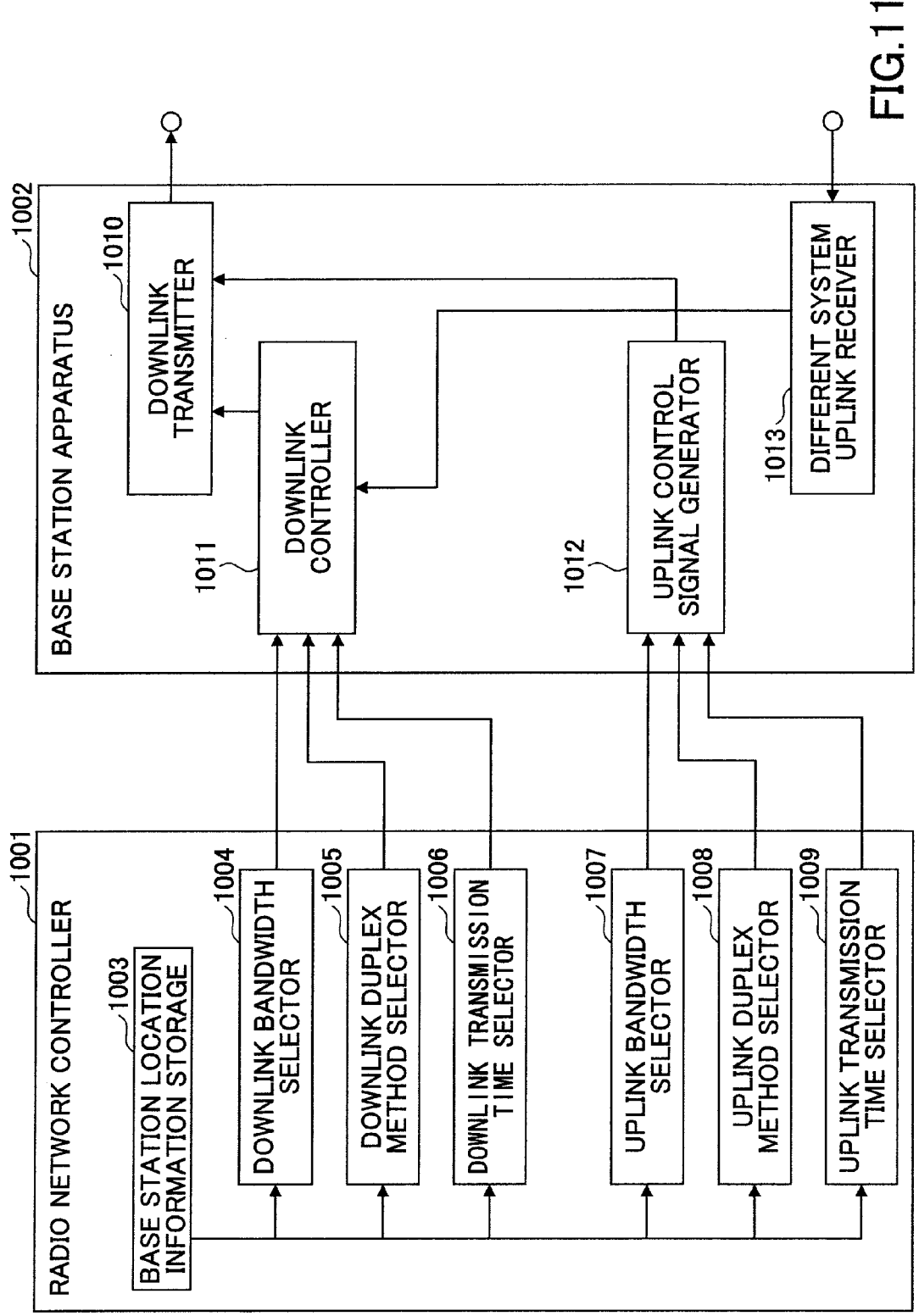
FIG. 11 is a diagram illustrating a variation of the radio network controller and the base station for adaptively changing a transmission method.

FIG. 11 illustrates a variation of the radio network controller and the base station for adaptively changing a transmission method. As shown, the same reference letters are provided for elements already explained in FIG. 6, explanations for which elements are not repeated. When a duplex communications method utilizing a non-transmission signal interval in downlink is used, a certain receiver 1013 can be provided at a base station apparatus to adaptively change a transmission bandwidth and a non-transmission interval in downlink. The different system uplink receiver 1013 measures an amount of bandwidth used and a total received power of a signal in the same frequency band as the frequency band used in downlink. The different system uplink receiver 1013 makes it possible to determine a bandwidth used by a terminal using uplink which provides impact within an own cell from a system operated in a neighboring area and a received power from the terminal. Obtained bandwidth and received power information may be utilized to estimate traffic volume and the number of terminals in a neighboring area and setting of transmission bandwidth and non-transmission interval used for downlink may be varied adaptively based on the information. (The initial value may be information determined by the radio network controller, for example.)

While the present invention has been described with reference to specific embodiments, the embodiments are merely exemplary, so that a person skilled in the art would understand variations, modifications, substitutions, replacements, etc.

For example, the present invention may also be applicable to frequency operation method which utilizes a carrier aggregation scheme, which is an elementary technique for an LTE-Advanced scheme and IEEE802.16m. Allocated multiple carriers are bundled to use the bundled carriers in the non-border area, while, in the border area or semi-border area, a carrier which does not interfere with a wireless system operated at a neighboring area is used out of the above-mentioned carriers. In other words, the present invention restricts the number of carriers used by a system to make it possible to also apply to a wireless system which adopts a carrier aggregation scheme. This is an equivalent way to a method of restricting a sub-carrier used in an OFDM scheme.

While specific numerical value examples are used to facilitate understanding of the present invention, such numerical values are merely examples, so that any appropriate value may be used unless specified otherwise. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-038023 filed on Feb. 19, 2008, the entire contents of which are hereby incorporated by reference.

The invention claimed is:

1. A base station apparatus used for a frequency division duplex (FDD) mobile communications system which uses at least a predetermined frequency bandwidth, wherein the predetermined frequency bandwidth is also used in a different neighboring FDD mobile communications system, the base station apparatus comprising:

a control unit which, based on location information of the base station apparatus, provides an instruction signal which at least indicates a frequency band used in wireless communications; and a unit which wirelessly communicates with a user apparatus according to the instruction signal, wherein, if the base station apparatus belongs to a predetermined border area between mobile communications systems, an instruction signal which indicates that use of one part of the predetermined frequency band is permitted, but use of another part is prohibited is provided by the control unit, and, if the base station apparatus belongs to a predetermined non-border area, an instruction signal which indicates that use of one part of the predetermined frequency band and use of the other part are permitted.

2. The base station apparatus as claimed in claim 1, wherein the predetermined frequency band is used in links of different directions between a mobile communications system which includes the base station apparatus and a different neighboring mobile communications, the different directions being uplink and downlink.

3. The base station apparatus as claimed in claim 2, wherein, if the base station apparatus belongs to a predetermined semi-border area between the mobile communications systems, an instruction signal which indicates that use of one part of the predetermined frequency band is permitted but use of another part is prohibited is provided by the control unit, and, wherein, if the base station apparatus belongs to a predetermined border area between the mobile communications systems, an instruction signal which indicates that use of one part of the predetermined frequency band is permitted at a certain timing but is prohibited at a different timing, and use of another part of the predetermined frequency band is prohibited is provided by the control unit.

4. The base station apparatus as claimed in claim 2, wherein a band for uplink that belongs to the predetermined frequency band and a band for downlink that does not belong to the predetermined frequency band make up a pair of bands.

5. The base station apparatus as claimed in claim 2, wherein a band for downlink that belongs to the predetermined frequency band and a band for uplink that does not belong to the predetermined frequency band make up a pair of bands.

6. The base station apparatus as claimed in claim 2, wherein the mobile communications system is an orthogonal frequency division multiplexing (OFDM) mobile communications system.

7. The base station apparatus as claimed in claim 1, further comprising a unit which receives and analyzes a signal from the different mobile communications system and determines a frequency bandwidth used by the base station apparatus according to results of the analyzing.

8. A user apparatus used for a frequency division duplex (FDD) mobile communications system which uses at least a predetermined frequency bandwidth, wherein the predetermined frequency bandwidth is also used in a different neighboring FDD mobile communications system, the user apparatus comprising:

a unit which receives a control signal from a base station apparatus and retrieves an instruction signal which at least indicates a frequency band used in communications; and a unit which wirelessly communicates with the base station apparatus according to the instruction signal, wherein the instruction signal indicates that, if the base station apparatus belongs to a predetermined border area between mobile communications systems, use of one part of the predetermined frequency band is permitted, but use of another part is prohibited, and wherein the instruction signal indicates that, if the base station apparatus belongs to a predetermined non-border area, use of the one part of the predetermined frequency band and use of the other part are permitted.

9. A frequency division duplex (FDD) mobile communications system which uses at least a predetermined frequency bandwidth, the mobile communications system having a base station apparatus and a user apparatus, wherein the predetermined frequency bandwidth is also used in a different neighboring FDD mobile communications system, the base station apparatus comprising:

a control unit which, based on location information of the base station apparatus, provides an instruction signal which at least indicates a frequency band used in wireless communications; and a unit which wirelessly communicates with a user apparatus according to the instructional signal and the user apparatus, comprising:

a unit which receives a control signal from the base station apparatus and retrieves the instruction signal from the control signal; and a unit which wirelessly communicates with the base station apparatus according to the instruction signal, wherein, if the base station apparatus belongs to a predetermined border area between mobile communications systems, an instruction signal which indicates that use of one part of the predetermined frequency band is permitted, but use of the other part is prohibited is provided by the control unit, and, wherein, if the base station apparatus belongs to a predetermined non-border area, an instruction signal which indicates that use of one part of the predetermined frequency band and use of the other part are permitted.

10. A method used in a frequency division duplex (FDD) mobile communications system which uses at least a predetermined frequency bandwidth, the mobile communications system having a base station apparatus and a user apparatus, wherein the predetermined frequency bandwidth is also used in a different neighboring FDD mobile communications system, the method comprising:

based on location information of the base station apparatus, providing an instruction signal which at least indicates a frequency band used in wireless communications;

receiving, at the user apparatus, a control signal from the base station apparatus and retrieving the instruction signal from the control signal; and wirelessly communicating between the user apparatus and the base station apparatus according to the instruction signal, wherein, if the base station apparatus belongs to a predetermined border area between mobile communications systems, an instruction signal which indicates that use of one part of the predetermined frequency band is permitted, but use of the other part is prohibited is provided by the control unit, and, wherein, if the base station apparatus belongs to a predetermined non-border area, an instructional signal which indicates that use of one part of the predetermined frequency band and use of the other part are permitted.

* * * * *